(12) United States Patent
Onish

(10) Patent No.: US 9,747,531 B1
(45) Date of Patent: Aug. 29, 2017

(54) ENVELOPE PRINTER

(71) Applicant: Paul Onish, Monroe Township, NJ (US)

(72) Inventor: Paul Onish, Monroe Township, NJ (US)

( * ) Notice: Subject to any disclaimer, the term of this patent is extended or adjusted under 35 U.S.C. 154(b) by 0 days.

(21) Appl. No.: 15/238,115

(22) Filed: Aug. 16, 2016

(51) Int. Cl.
G06K 15/02 (2006.01)
G06K 15/16 (2006.01)
B41J 3/407 (2006.01)
B41J 13/12 (2006.01)

(52) U.S. Cl.
CPC ............ *G06K 15/021* (2013.01); *B41J 3/407* (2013.01); *B41J 13/12* (2013.01); *G06K 15/16* (2013.01); *B65H 2701/1916* (2013.01); *G06K 2215/0097* (2013.01)

(58) Field of Classification Search
CPC ......... G06K 15/021; G06K 2215/0097; G06K 15/16; B41J 3/407; B41J 13/12; B41J 3/28; B65H 2701/1916; G03G 2215/00514
See application file for complete search history.

(56) References Cited

U.S. PATENT DOCUMENTS

| 2,896,536 | A |  | 7/1959 | Sauerman |
| 4,742,771 | A |  | 5/1988 | Heilig |
| D353,154 | S |  | 12/1994 | Suzuki |
| 5,450,187 | A |  | 9/1995 | Pei |
| 5,678,160 | A |  | 10/1997 | Williams |
| 5,862,243 | A | * | 1/1999 | Baker ....................... B07C 3/14 209/272 |
| 6,304,731 | B1 |  | 10/2001 | Able |

FOREIGN PATENT DOCUMENTS

WO 8802734 A1 4/1988

* cited by examiner

*Primary Examiner* — Henok Legesse
(74) *Attorney, Agent, or Firm* — Kyle A. Fletcher, Esq.

(57) ABSTRACT

The envelope printer is adapted for use with envelopes. The envelope printer is a printer that is customized for printing envelopes. The envelope printer comprises a feed tray, an output tray and a printer. The feed tray and the output tray are attached to the printer. The feed tray is a first bin that is designed specifically to hold envelopes. The printer will draw blank envelopes from the feed tray for printing. The output tray is a second bin that is designed specifically to receive envelopes from the printer. The printer is a specially designed printer that is optimized for processing and directly printing on envelopes.

17 Claims, 6 Drawing Sheets

ENVELOPE PRINTER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of devices and arrangements for selective printing mechanisms, more specifically, a device specially adapted for printing envelopes.

SUMMARY OF INVENTION

The envelope printer is adapted for use with envelopes. The envelope printer is a printer that is customized for printing envelopes. The envelope printer comprises a feed tray, an output tray and a printer. The feed tray and the output tray are attached to the printer. The feed tray is a first bin that is designed specifically to hold envelopes. The printer will draw blank envelopes from the feed tray for printing. The output tray is a second bin that is designed specifically to receive processed envelopes from the printer. The printer is a specially designed printer that is optimized for processing and directly printing on envelopes.

These together with additional objects, features and advantages of the envelope printer will be readily apparent to those of ordinary skill in the art upon reading the following detailed description of the presently preferred, but nonetheless illustrative, embodiments when taken in conjunction with the accompanying drawings.

In this respect, before explaining the current embodiments of the envelope printer in detail, it is to be understood that the envelope printer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the envelope printer.

It is therefore important that the claims be regarded as including such equivalent construction insofar as they do not depart from the spirit and scope of the envelope printer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
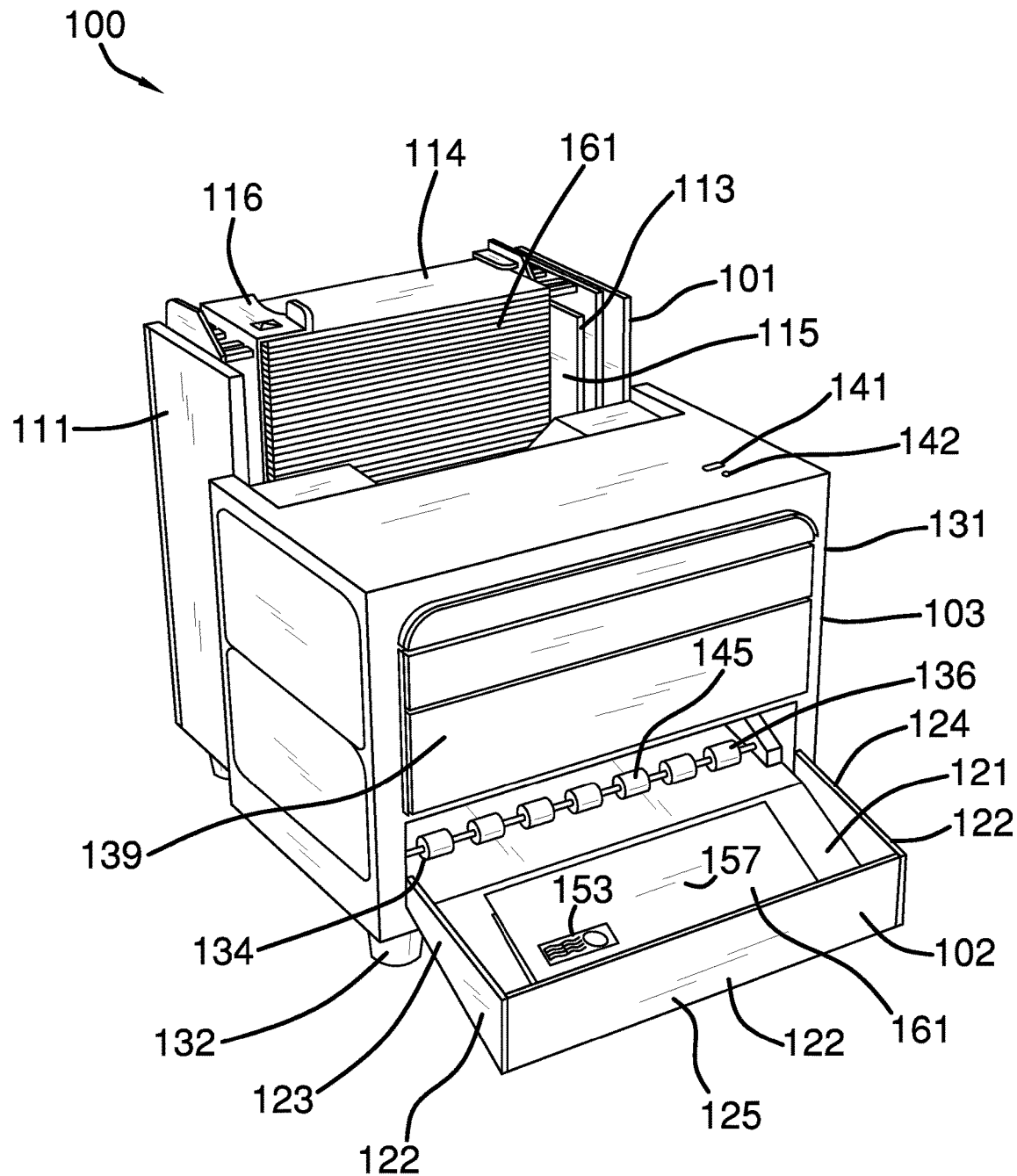
FIG. 1 is a perspective view of an embodiment of the disclosure.
Figure 2:
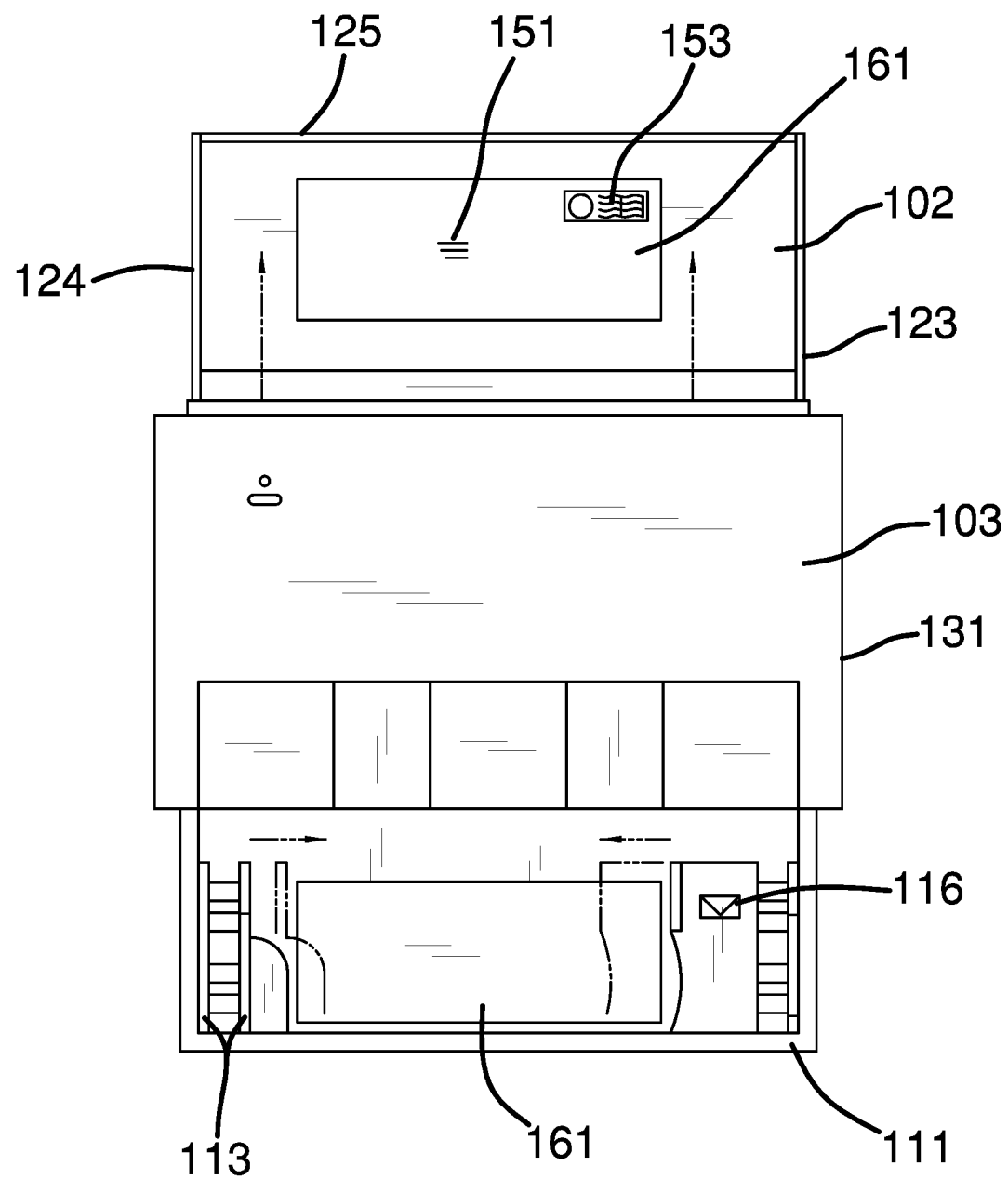
FIG. 2 is a top view of an embodiment of the disclosure.
Figure 3:
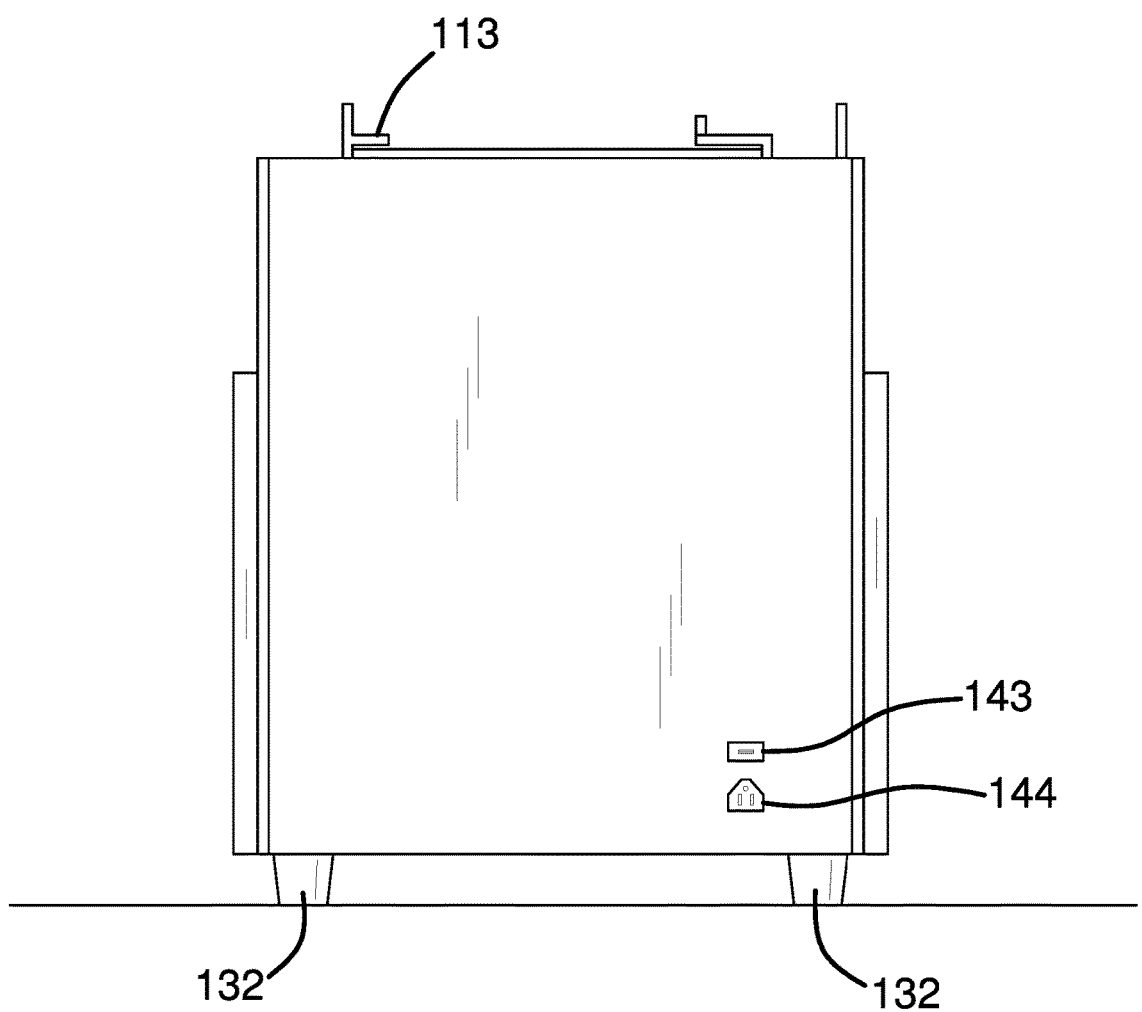
FIG. 3 is a rear view of an embodiment of the disclosure.
Figure 4:
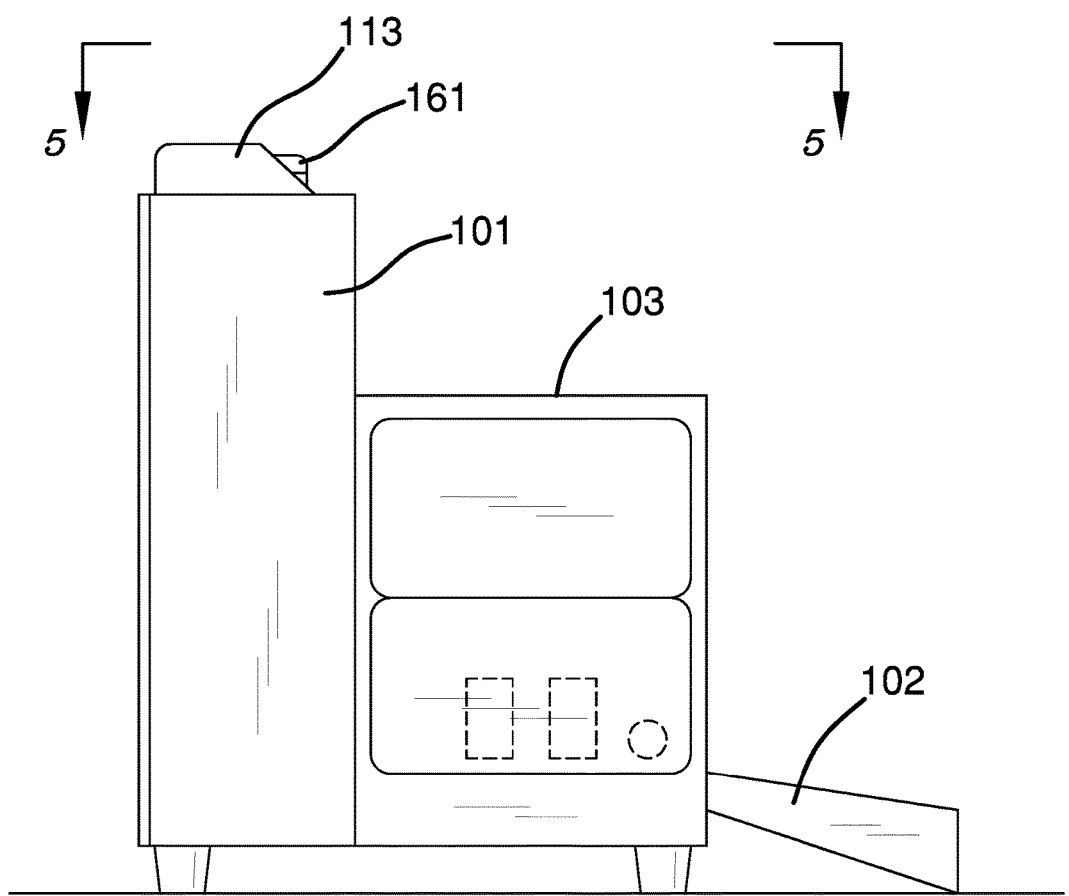
FIG. 4 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The envelope printer 100 (hereinafter invention) comprises a feed tray 101, an output tray 102 and a printer 103. The feed tray 101 and the output tray 102 are attached to the printer 103. The invention 100 is adapted for use with an envelope 161. The invention 100 is a printer 103 that is customized for printing directly on an envelope 161. The feed tray 101 is a first bin that is designed specifically to hold envelopes 161. The printer 103 will draw a blank envelope 161 from the feed tray 101 for printing. The output tray 102 is a second bin that is designed specifically to receive a processed envelope 161 from the printer 103. The printer 103 is a specially designed printer 103 that is optimized for processing and directly printing on an envelope 161. The invention 100 is intended to rest on a supporting surface 162.

The feed tray 101 comprises a column 111, a connector 112, an adjustable edge guide 113, an open top face 114 and an open front face 115. The purpose of the feed tray 101 is to store a plurality of envelopes 161 for use by the printer 103. The feed tray 101 is designed to store envelopes 161 of the same size. The column 111 is a hollow rectangular block that further comprises the open top face 114 and the open front face 115. The plurality of envelopes 161 are stored within the hollow interior of the column 111. The open top face 114 is the face of the column that is distal from the supporting surface 162. The purpose of the open top face 114 is to allow for the placement of the plurality of envelopes 161 into the hollow interior of the column 111. The open front face 115 is the face of the column 115 that is proximal to the printer 103 when the printer 103 is in use. The column 111 is attached to the printer through the use of the connector 112. The connector 112 comprises one or more latches that are used to attach the column directly to the housing 131 of the printer 103. The printer 103 housing 131 is discussed in detail elsewhere in this disclosure.

In the first potential embodiment of the disclosure, the one or more latches comprises a first locking tab mechanism and a second locking tab mechanism. The hollow interior of the column 111 contains the adjustable edge guide 113. The adjustable edge guide 113 is a moveable framework that is designed to adjust the effective inner dimensions of the hollow interior of the column 111 to match the selected size of each of the plurality of envelopes 161.

An adjustable edge guide 113 is capable of creating inner dimensions within the column ranging from 3.5 to 10.0 inches in a first dimension and 5.1 inches to 15.0 inches in a second dimension will be able to accommodate virtually every envelope that is commercially available at the time of the filing of this disclosure. A column ranging from 3.65 inches to 10.0 inches in the first dimension and 7.0 inches to 13.0 inches in the second dimension will be able to accommodate the most commonly used envelopes. A column ranging from 3.5 inches to 4.0 inches in the first dimension 7.0 inches to 9.5 inches in the second dimension will be able to handle most business correspondence envelopes. The adjustable edge guide 113 has further formed in it an engraved image 116 that allows that visually informs users of the orientation of the loaded envelopes 161 that is expected by the printer 103. Methods to form columns 111, connectors 112, and adjustable edge guides 113 are well known and documented in the mechanical arts.

The output tray 102 comprises a platform 121 and a plurality of guides 122. The purpose of the output tray 102 is to receive and store envelopes 161 printed by the printer 103. In the first potential embodiment of the disclosure, the output tray 102 is permanently attached to the printer 103 housing 131. The platform 121 is a horizontal surface that is intended to keep the printed envelopes 161 from falling directly on the supporting surface 162. The plurality of guides 122 comprises a first barrier 123 and a second barrier 124 that project perpendicularly away from the printer 103 housing 131 as well as a third barrier 125 connecting the first barrier 123 and the second barrier 124 for the purpose of preventing the printed envelope 161 from out of the output tray 102.

The printer 103 comprises a housing 131, a plurality of feet 132, a feed aperture 133, an ejection aperture 134, a base 135, a plurality of rollers 136, a printer head 137, a circuit board 138, a door 139, an inkwell 140, a power switch 141, a power LED 142, a printer port 143, and a power port 144. The purpose of the printer 103 is to apply an address 151, a return address 152, postage 153, and one or more visual messages 154 to the envelope 161 in preparation for use. The housing 131 is a rigid casing that forms the physical structure of the printer 103. The plurality of feet 132, the power switch 141, the power LED 142, the printer port 143 and the power port 144 are mounted on the exterior of the housing 131 or such that they can be accessed from the exterior of the housing 103. The feed aperture 133, the ejection aperture 134 and the door 139 are apertures that are formed through the surface of the housing 131. The base 135, the plurality of rollers 136, the printer head 137, the circuit board 138, and the inkwell 138 are contained within the housing 131.

In the first potential embodiment of the disclosure, the housing 131 is a rectangular block structure. Each of the plurality of feet 132 are non-skid pads that are applied to the surface of the housing 131 that is proximal to the supporting surface 162. The purpose of the plurality of feet 132 is to: 1) protect the supporting surface 162 from damage; and 2) prevent the housing 131 from slipping across the supporting surface 162. The feed aperture 133 is a first aperture that is formed in the surface of the housing 131 that is proximal to the feed tray 101. Any envelope 161 that will be printed by the printer 103 is drawn through the feed aperture 133. The ejection aperture 134 is a second aperture through which the processed envelope 161 is ejected. The ejection aperture 134 ejects the processed envelope 161 into the output tray 102. The door 139 is a third aperture that is formed in the surface of the housing 131 that is covered with a hinged barrier that can be rotated away from the surface of the housing 131 to gain access to the interior of the housing 131 for maintenance purposes such as replacing ink or clearing paper jams. Methods to add doors 139, apertures, and barriers to housings 131 are well known and documented in the mechanical arts.

The base 135 is a supporting surface upon which an envelope 161 will rest as it is processed through the printer 103.

Figure 5:
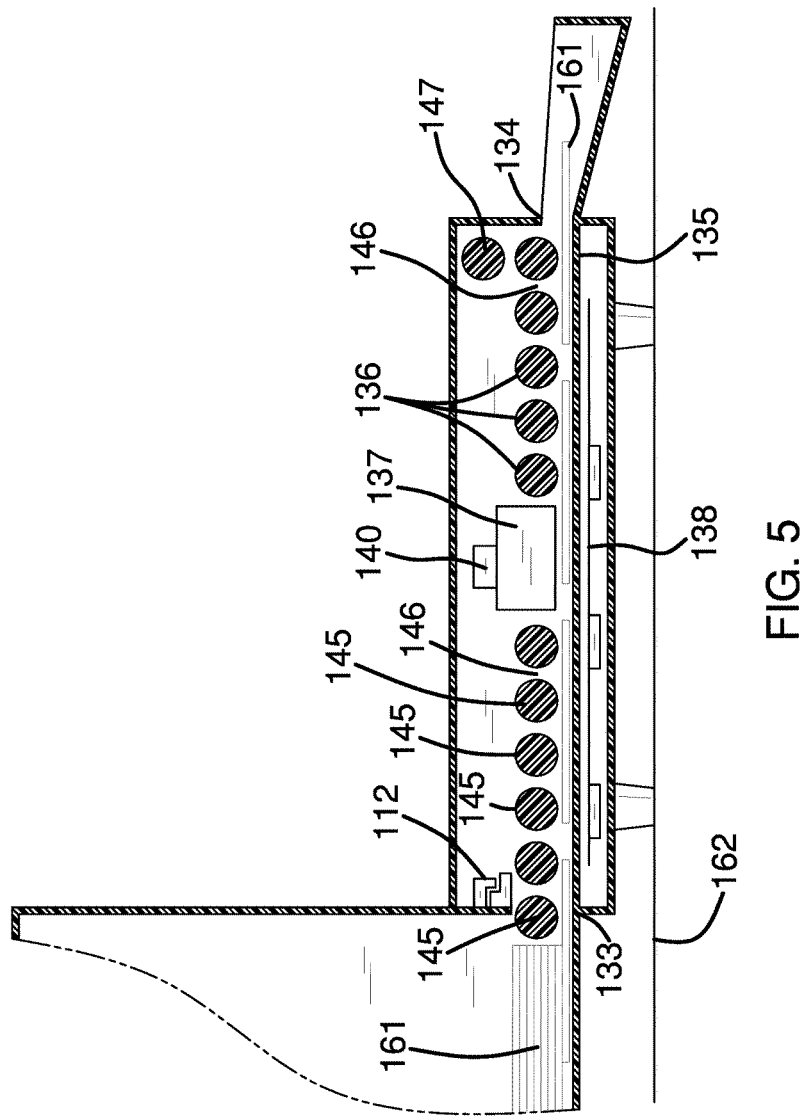
FIG. 5 is a cross-sectional view of an embodiment of the disclosure across 5-5 as shown in FIG. 4.
Figure 6:
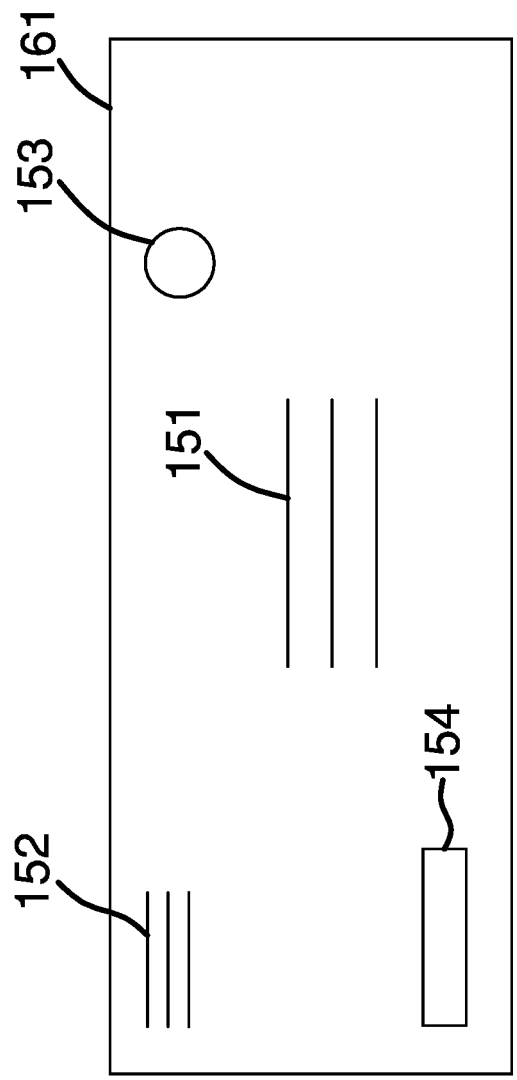
FIG. 6 is a detail view of an embodiment of the disclosure.

The plurality of rollers 136 comprises a plurality of individual roller assemblies 145 that physically move the envelope 161 through the printer 103 during processing. The plurality of rollers 136 comprises a collection of individual roller assemblies 145, a linking mechanism 146, and an electric motor 147. The plurality of rollers 136 are mounted above the base 135 as shown in FIG. 5 such that when the plurality of rollers 136 rotates each envelope 161 being process is pushed by the rotation of each individual roller assembly 145 in contact with the envelope 161. Each individual roller assembly 145 selected from the plurality of rollers 136 is a cylindrical structure that is interconnected with the individual roller assemblies 145 remaining in the plurality of rollers 136 with the linking mechanism 146. The linking mechanism 146 is the mechanical device that interconnects the individual roller assemblies 145 such that they all rotate in a synchronized manner. The rotation of the plurality of rollers 136 is powered with the electric motor 147. In the first potential embodiment of the disclosure, as shown in FIG. 5, at least one individual roller assembly 145 extends beyond the feed aperture 133 such that the individual roller assembly 145 can gain purchase on an envelope 161 stored within the feed tray 101. Methods to build the plurality of rollers 136 as described in this paragraph are well known and documented in the mechanical arts.

The printer head 137 is a readily commercially available electrical device that is designed to apply a pigment to the surface of the envelope 161 such that the address 151, the return address 152, the postage 153 and any visual messages 154 can be applied to the envelope 161. The printer head 137 is selected from the group consisting of an ink jet printer head or a laser printer head. The inkwell 140 is a container within which the pigment used by the printer head 137 is contained. The inkwell 140 is specifically adapted for use with the selected printer head 137. In the first potential embodiment of the disclosure, the printer head 137 is a readily and commercially available inkjet printer head, which contains provisions for receiving the inkwell 140.

The power switch 141 is a readily and commercially electrical switch that is configured to turn the invention 100 on and off. The power LED is a readily and commercially light emitting diode that provides a visual indication of the on or off status of the invention 100. The power port 144 is a readily and commercially port that is designed to receive electrical power from the national electric grid. The printer port 143 is a readily and commercially available port that is designed to receive instructions from a separately supplied computer system regarding the images that are to be applied to each envelope 161.

Methods of communicating between printers 103 and separately supplied computer systems using ports are well known and documented in the electrical arts. Alternatively, a wireless communication between the printer 103 and the separately supplied computer system can be implemented using readily and commercially available wireless communication protocols. Suitable wireless communication protocols include, but are not limited to, Bluetooth or 802.11.

The purpose of the circuit board 138 is to control the operation of the invention 100. A primary function of the circuit board 138 is to receive instructions through the printer port 143 and to translate those instruction into actions by the plurality of rollers 136 and the printer head 137 that result in the address 151, the return address 152, the postage 153 and any visual messages 154 being properly applied to an envelope 161. Methods to design circuit boards 138 and the appropriate software to implement this function are well known and documented in the electrical arts. Circuit boards 138 and software as described in this disclosure are commercially available. In the first potential embodiment of the disclosure, the printer port 143 is a commercially available USB port.

The invention is used as a normal printer with the exception that envelopes are exclusively loaded within the feed tray 101.

The feed tray 101, the output tray 102, the housing 131 are custom designed and are formed from molded plastic. The remaining components are commercially available. Methods to assemble the described components are known and documented within the mechanical arts and the electrical arts.

The following definitions and directional references were used in this disclosure:

Bluetooth: As used in this disclosure, Bluetooth is a standardized communication protocol that is used to wirelessly interconnect electronic devices.

Cantilever: As used in this disclosure, a cantilever is a beam or other structure that projects away from an object and is supported on only one end.

Diode: As used in this disclosure, a diode is a two terminal semiconductor device that allows current flow in only one direction. The two terminals are called the anode and the cathode.

Electric Motor: In this disclosure, an electric motor is a machine that converts electric energy into rotational mechanical energy.

Engrave: As used in this disclosure, to engrave is to carve, cut, or etch an image into a material.

Envelope: As used in this disclosure, an envelope is a readily and commercially available flat folded paper container. Envelopes will generally have a method of sealing contents contained within the envelope. Commercially available envelopes come in a plurality of sizes including a large number of standardized sizes.

Housing: As used in this disclosure, a housing is a rigid casing that encloses and protects one or more devices.

Inner Dimension: As used in this disclosure, the term inner dimension describes the span from a first inside or interior surface of a container to a second inside or interior surface of a container. The term is used in much the same way that a plumber would refer to the inner diameter of a pipe.

Latch: As used in this disclosure, a latch is a fastening or locking mechanism. The use of the term latch does not necessarily but often implies the insertion of an object into a notch or cavity.

LED: As used in this disclosure, an LED is an acronym for a light emitting diode. A light emitting diode is a diode that is also a light source.

Locking Tab: As used in this disclosure, a locking tab is a two-element fastener wherein the first element of the fastener, which is mounted on a first object is a cantilever spring and the second element of the fastener is a hole which is formed in a second object. The free end of the cantilever spring has a hook formed in it such that when the free end of the cantilever spring is inserted into the hole, the hook latches against the edge of the hole preventing inadvertent removal of the cantilever spring. The first element is removed from the second element by bending the cantilever spring such that the hook clears the edge of the hole and then pulling the first element away from the second element.

National Electric Grid: As used in this disclosure, the national electric grid is a synchronized and highly interconnected electrical network that distributes energy in the form of electric power from a plurality of generating stations to consumers of electricity.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Port: As used in this disclosure, a port is an electrical termination that is used to connect a first electrical circuit to a second external electrical circuit. In this disclosure, the port is designed to receive a plug.

Printer: As used in this disclosure, a printer is a device that receives text or graphical output from a computer and transfers the information to paper.

Roller: As used in this disclosure, a roller is revolving cylindrical device which is used to: 1) move an object; 2) press an object; 3) shape an object; 4) smooth an object; or, 5) crush an object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

USB: As used in this disclosure, USB is an acronym for Universal Serial Bus, which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

The following directional references are used in this disclosure: when comparing a first object and a second object, a first object is said to be above the second object when the second object is between the first object and the supporting surface. In such a situation, the second object is said to be below the first object.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A device comprising:
a feed tray, an output tray and a printer;
wherein the printer prints an address, a return address, postage, and one or more visual messages to an envelope;
wherein the feed tray and the output tray are attached to the printer;
wherein the device is for use with said envelope;
wherein the printer is customized for printing directly on said envelope;
wherein the feed tray is a first bin that stores a plurality of unprocessed envelopes;
wherein the envelope is one of the plurality of unprocessed envelopes;
wherein the printer draws a blank envelope from the feed tray;
wherein the output tray is a second bin that receives one or more processed envelopes from the printer;
wherein the device is intended to rest on a supporting surface;
wherein the feed tray comprises a column, a connector, and an adjustable edge guide;
wherein the connector attaches the column to the printer;
wherein the adjustable edge guide is mounted in the column;
wherein the feed tray stores envelopes of the same size;
wherein the column is a hollow rectangular block that comprises an open top face and an open front face;
wherein the plurality of envelopes are stored within the hollow interior of the column;
wherein the open top face is the face of the column that is distal from the supporting surface;
wherein the plurality of envelopes are placed in the hollow interior of the column through the open face;
wherein the connector comprises at least one latch that are used to attach the column directly to the housing of the printer.

2. The device according to claim 1
wherein the hollow interior of the column contains the adjustable edge guide;
wherein the adjustable edge guide is a moveable framework that is designed to adjust the effective inner dimensions of the hollow interior of the column to match the selected size of each of the plurality of envelopes.

3. The device according to claim 2 wherein the adjustable edge guide has further formed in it an engraved image indicating the orientation of the plurality of envelopes that is anticipated by the printer.

4. The device according to claim 3 wherein the output tray comprises a platform and a plurality of guides;
wherein the output tray is permanently attached to the printer housing;
wherein the platform is a horizontal surface that is intended to keep the printed envelopes from falling directly on the supporting surface;
wherein the plurality of guides comprises a first barrier and a second barrier that project perpendicularly away from the printer housing;
wherein the plurality of guides comprises a third barrier connecting the first barrier and the second barrier.

5. The device according to claim 4 wherein the adjustable edge guide creates inner dimensions within the column ranging from 3.5 inches to 4.0 inches in the first dimension 7.0 inches to 9.5 inches in the second dimension.

6. The device according to claim 5
wherein the printer comprises a housing, a plurality of feet, a feed aperture, an ejection aperture, a base, a plurality of rollers, a printer head, a circuit board, a door, an inkwell, a power switch, a power LED, and a power port;
wherein the housing is a rigid casing;
wherein the plurality of feet, the power switch, the power LED, and the power port is mounted on the housing in a manner that is selected from the group consisting of mounting on the exterior of the housing or mounting in a manner that is accessible from the exterior of the housing;
wherein the feed aperture, the ejection aperture and the door are apertures that are formed through the surface of the housing;
wherein the base, the plurality of rollers, the printer head, the circuit board, and the inkwell are contained within the housing.

7. The device according to claim 6
wherein the housing is a rectangular block structure;
wherein each of the plurality of feet are non-skid pads that are applied to the surface of the housing that is proximal to the supporting surface;
wherein the feed aperture is a first aperture that is formed in the surface of the housing that is proximal to the feed tray such that any envelope processed by the printer is drawn through the feed aperture;
wherein the ejection aperture is a second aperture through which the processed envelope is ejected;
wherein the ejection aperture ejects the processed envelope into the output tray;
wherein the door is a third aperture that is formed in the surface of the housing;
wherein the door is covered with a hinged barrier that is rotated away from the surface of the housing such that access can be gained into the interior of the housing.

8. The device according to claim 7 wherein the base is a supporting surface upon which an envelope will rest as it is processed through the printer.

9. The device according to claim 8
wherein the plurality of rollers comprises a plurality of individual roller assemblies;
wherein the plurality of rollers comprises a collection of individual roller assemblies, a linking mechanism, and an electric motor;
wherein the plurality of rollers are mounted above the base;
wherein as the plurality of rollers rotates each envelope being process is pushed by the rotation of each individual roller assembly in contact with the envelope.

10. The device according to claim 9
wherein the plurality of rollers comprises a collection of individual roller assemblies, a linking mechanism, and an electric motor;
wherein each individual roller assembly selected from the plurality of rollers is a cylindrical structure;

wherein each individual roller assembly selected from the plurality of rollers is interconnected with the individual roller assemblies remaining in the plurality of rollers with the linking mechanism;
wherein the linking mechanism is the mechanical device that interconnects the individual roller assemblies such that they all rotate in a synchronized manner;
wherein the rotation of the plurality of rollers is powered with the electric motor;
wherein at least one individual roller assembly extends beyond the feed aperture such that the individual roller assembly can gain purchase on an envelope stored within the feed tray.

11. The device according to claim 10
wherein the printer head is an electrical device that is designed to apply a pigment to the surface of the envelope such that the address, the return address, the postage and any visual messages are applied to the envelope;
wherein the printer head is selected from the group consisting of an ink jet printer head or a laser printer head;
wherein the inkwell is a container within which the pigment used by the printer head is contained.

12. The device according to claim 11
wherein the power switch is an electrical switch that is configured to turn the device on and off;
wherein the power LED is a light emitting diode that provides a visual indication of the on or off status of the device;
wherein the power port is a port that is designed to receive electrical power from the national electric grid.

13. The device according to claim 12
wherein the printer further comprises a printer port;
wherein the printer port is an electrical port that is designed to receive instructions from a separately supplied computer system regarding the images that are to be applied to each envelope;
wherein the printer port is selected from the group consisting of a wired connection or a wireless connection.

14. The device according to claim 13
wherein the circuit board controls the operation of the device;
wherein the circuit board receives instructions through the printer port and translates those instruction into actions by the plurality of rollers and the printer head.

15. The device according to claim 4 wherein the adjustable edge guide creates inner dimensions within the column selected form the group consisting of a range from 3.5 to 10.0 inches in a first dimension and 5.1 inches to 15.0 inches in a second dimension or a range of 3.65 inches to 10.0 inches in the first dimension and 7.0 inches to 13.0 inches in the second dimension.

16. The device according to claim 15
wherein the printer comprises a housing, a plurality of feet, a feed aperture, an ejection aperture, a base, a plurality of rollers, a printer head, a circuit board, a door, an inkwell, a power switch, a power LED, and a power port;
wherein the housing is a rigid casing;
wherein the plurality of feet, the power switch, the power LED, and the power port is mounted on the housing in a manner that is selected from the group consisting of mounting on the exterior of the housing or mounting in a manner that is accessible from the exterior of the housing;
wherein the feed aperture, the ejection aperture and the door are apertures that are formed through the surface of the housing;
wherein the base, the plurality of rollers, the printer head, the circuit board, and the inkwell are contained within the housing;
wherein the housing is a rectangular block structure;
wherein each of the plurality of feet are non-skid pads that are applied to the surface of the housing that is proximal to the supporting surface;
wherein the feed aperture is a first aperture that is formed in the surface of the housing that is proximal to the feed tray such that any envelope processed by the printer is drawn through the feed aperture;
wherein the ejection aperture is a second aperture through which the processed envelope is ejected;
wherein the ejection aperture ejects the processed envelope into the output tray;
wherein the door is a third aperture that is formed in the surface of the housing;
wherein the door is covered with a hinged barrier that can be rotated away from the surface of the housing such that access can be gained into the interior of the housing;
wherein the base is a supporting surface upon which an envelope will rest as it is processed through the printer;
wherein the plurality of rollers comprises a plurality of individual roller assemblies;
wherein the plurality of rollers comprises a collection of individual roller assemblies, a linking mechanism, and an electric motor;
wherein the plurality of rollers are mounted above the base;
wherein as the plurality of rollers rotates each envelope being process is pushed by the rotation of each individual roller assembly in contact with the envelope;
wherein the plurality of rollers comprises a collection of individual roller assemblies, a linking mechanism, and an electric motor;
wherein each individual roller assembly selected from the plurality of rollers is a cylindrical structure;
wherein each individual roller assembly selected from the plurality of rollers is interconnected with the individual roller assemblies remaining in the plurality of rollers with the linking mechanism;
wherein the linking mechanism is the mechanical device that interconnects the individual roller assemblies such that they all rotate in a synchronized manner;
wherein the rotation of the plurality of rollers is powered with the electric motor;
wherein at least one individual roller assembly extends beyond the feed aperture such that the individual roller assembly can gain purchase on an envelope stored within the feed tray;
wherein the printer head is an electrical device that is designed to apply a pigment to the surface of the envelope such that the address, the return address, the postage and any visual messages are applied to the envelope;
wherein the printer head is selected from the group consisting of an ink jet printer head or a laser printer head;
wherein the inkwell is a container within which the pigment used by the printer head is contained;
wherein the power switch is an electrical switch that is configured to turn the device on and off;

wherein the power LED is a light emitting diode that provides a visual indication of the on or off status of the device;

wherein the power port is a port that is designed to receive electrical power from the national electric grid.

17. The device according to claim 16 wherein the printer further comprises a printer port;

wherein the printer port is an electrical port that is designed to receive instructions from a separately supplied computer system regarding the images that are to be applied to each envelope;

wherein the printer port is selected from the group consisting of a wired connection or a wireless connection;

wherein the circuit board controls the operation of the device;

wherein the circuit board receives instructions through the printer port and translates those instruction into actions by the plurality of rollers and the printer head.

* * * * *